United States Patent

Schmidt, Jr.

[15] 3,695,443
[45] Oct. 3, 1972

[54] FILTER APPARATUS
[72] Inventor: Henry Schmidt, Jr., Hinsdale, Ill.
[73] Assignee: Industrial Filter & Pump Mfg. Co., Cicero, Ill.
[22] Filed: Aug. 20, 1970
[21] Appl. No.: 65,393

[52] U.S. Cl. ............210/315, 210/457, 210/497
[51] Int. Cl. .............................................B01d 27/00
[58] Field of Search......210/457, 458, 484, 489, 323, 210/507, 497, 315, 338

[56] References Cited

UNITED STATES PATENTS

| | | | |
|---|---|---|---|
| 2,725,144 | 11/1955 | Smith et al. | 210/458 |
| 3,543,940 | 12/1970 | Schmidt, Jr. | 210/507 X |
| 3,438,502 | 4/1969 | Schmidt, Jr. et al. | 210/323 X |
| 3,394,815 | 7/1968 | Harms et al. | 210/323 |
| 3,422,958 | 1/1969 | Newman | 210/457 |

Primary Examiner—Reuben Friedman
Assistant Examiner—Frederick F. Calvetti
Attorney—Fidler, Patnaude & Lazo

[57] ABSTRACT

A tubular filter element for use in a tube-type filter includes an externally-ribbed plastic core which is hollow throughout its length and which is surrounded by a coarsely-perforated plastic sleeve. The sleeve serves to space an outer finely-perforated cake-supporting tube from the core. A pair of plastic end members fit over and are heat welded to the core and the sleeve, the upper member being apertured. The core is apertured such that liquid passing through the outer tube and the sleeve passes downwardly along the outer surface of the core and up through the hollow cavity in the core during a filtering operation and in the reverse direction during a cake removal operation.

11 Claims, 8 Drawing Figures

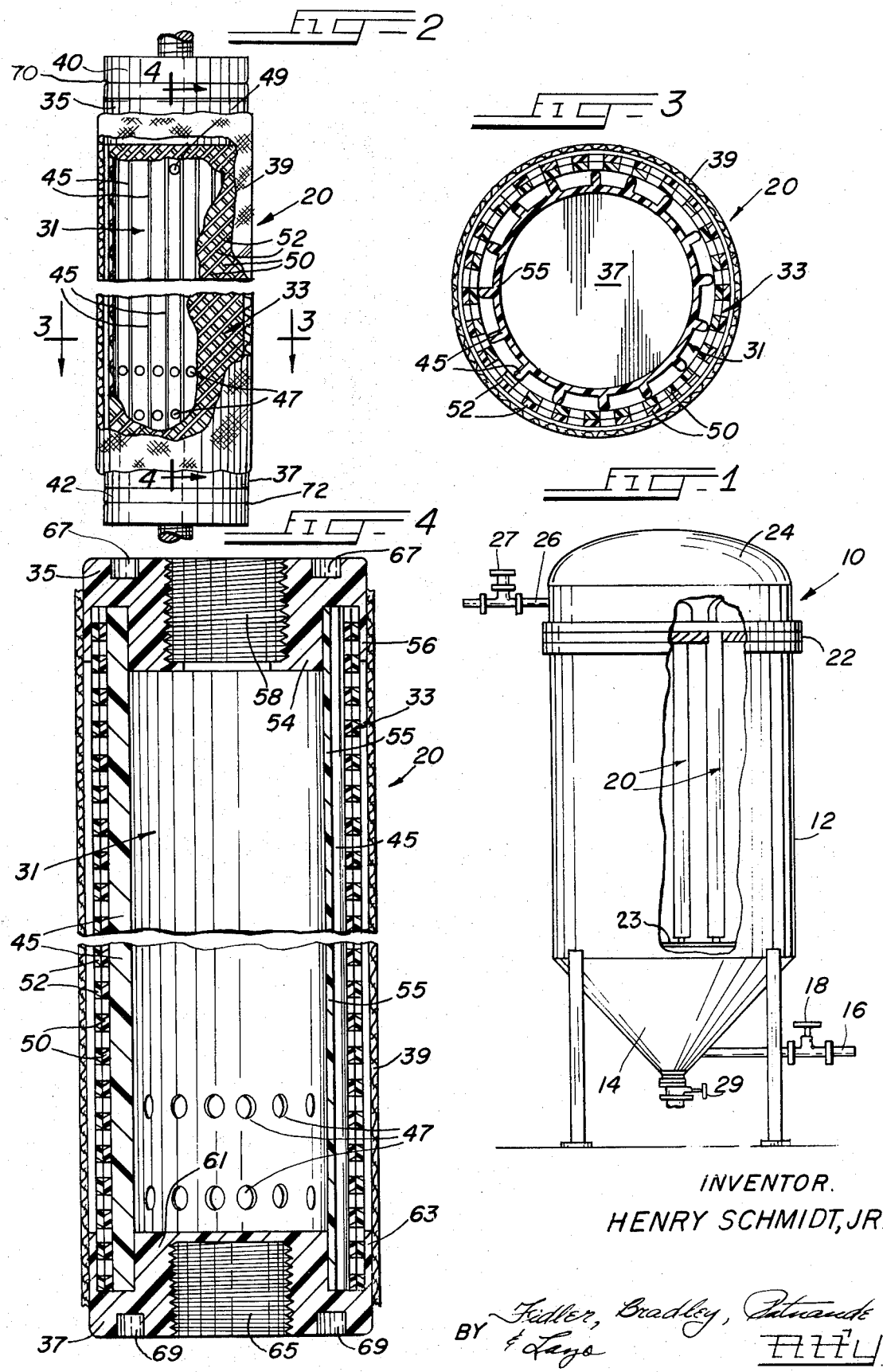

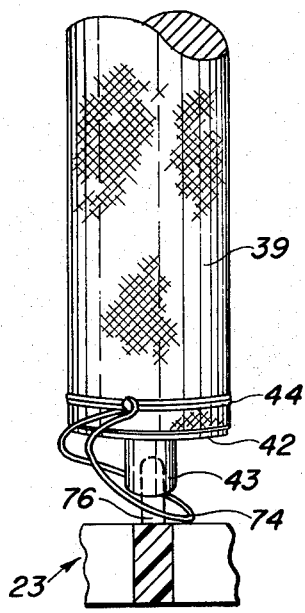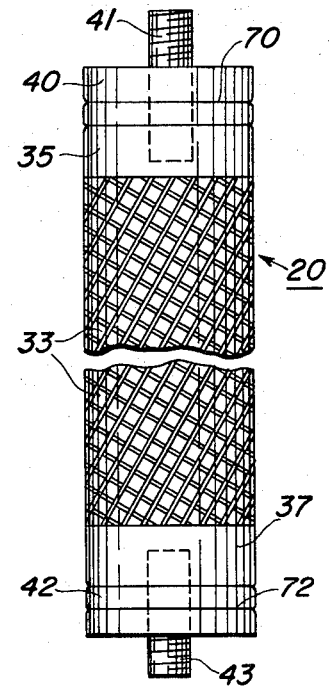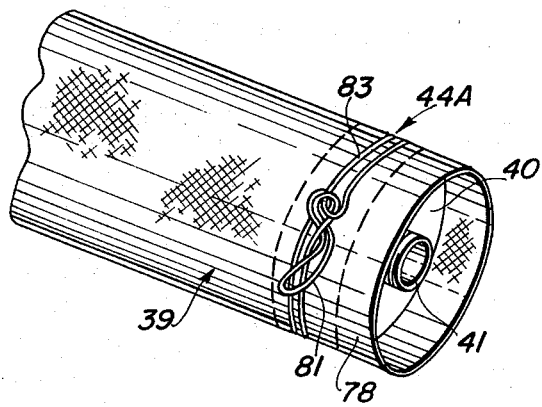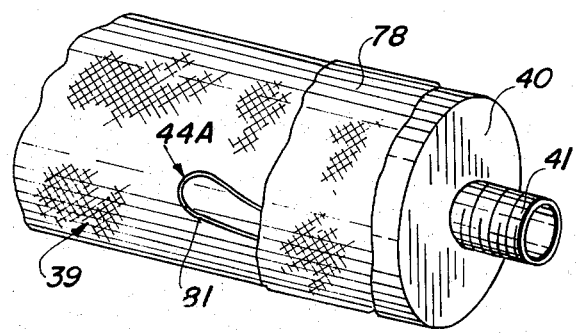

FILTER APPARATUS

The present invention relates generally to filtration apparatus for removing entrained solids suspended in a liquid, and it more particularly relates to a new and improved filter element for use in a tube-type filter employing apparatus for causing a high velocity reverse flow of liquid through the tubular filter elements during a cleaning operation to remove a filter cake deposited on the outside surfaces of the elements.

Tube-type filters ordinarily employ a plurality of perforated tubular filter elements which are interconnected between the inlet and outlet portions of the unit so that as the fluid to be clarified passes from the inlet to the outlet it must pass through a porous filter cake deposited on the perforate walls of the filter element. Accordingly, the entrained solids are removed from the liquid. As the solids are thus deposited on the filter elements the porous cakes which adhere to the outside surfaces thereof continue to increase in thickness until the filter cakes reach some predetermined thickness where operational efficiency is impaired. At this time, the cakes must be removed in order to provide efficient operation of the system. Removal of the filter cakes is commonly referred to as a filter cleaning operation and is accomplished in certain types of filters by reversing the flow of liquid through the filter elements thereby to dislodge the cakes. The dislodged cake thus falls to the bottom of the filter chamber and passes out through a drain port.

During the normal filtering operation, in order to prevent an accumulation of fine particles which frequently settle out of the liquid to be clarified at the inside of the filter elements and deposit on the bottom wall of the filter elements, in some applications each of the filter elements is provided with an inner tube which is commonly known as a "blow-down" tube and which extends within the cavity of the filter element from the top of the filter element to a point near the bottom thereof. As a result, fluid passing through the filter cake and into the cavity of the filter element flows downwardly along the outer surfaces of the tube and into the bottom end thereof whereby the fluid flows at a high velocity into the tube near the bottom wall of the filter element to cause any settled-out fine particles to be agitated so that they do not collect and form a heel which could be a source of contamination to the clarified liquid and also impair the operational efficiency of the filter. Moreover, during the filter cleaning cycle of operation, liquid is forced through the inner tube and then out its bottom end so that the liquid more evenly dislodges the filter cake from the filter element.

All of the foregoing requirements and features have only been met by filter tube designs in which relatively expensive, corrosive-resistant materials were used since the filter elements are continually bathed in the liquid to be clarified. Therefore, it would be desirable to provide a filter element which possesses the foregoing features and which is entirely composed of plastic material so that the filter element is relatively inexpensive to manufacture and does not become corroded thereby to eliminate contamination problems, especially where the filter is used for processing food products. Moreover, it is desirable that such a filter tube be sufficiently strong and self-supporting to withstand extremely high pressure differentials across the walls thereof, and in many applications to withstand high operating temperatures. In addition, it is desirable that such tubes have a substantially long life, and since filters require periodic maintenance wherein the tubes are removed, the filter tubes should be extremely sturdy so that when subjected to rough handling they will not be damaged. Since a large number of filter tubes are commonly used in a single filter, another requirement of such filter tubes is that the cost thereof not be excessive.

Therefore, an object of the present invention is to provide a new and improved tubular filter element of this general type which is entirely composed of plastic material and which is strong and durable in construction.

Another object of the present invention is to provide a new and improved filter element which is relatively less expensive to manufacture than prior art type filter elements and which possesses the advantages of the heretofore known prior art filter elements.

Briefly, the above and further objects are realized in accordance with the present invention by providing a tubular filter element which includes an externally-ribbed plastic core having a cavity therein and a coarsely perforated plastic sleeve surrounding and tightly fitted over the core. The sleeve adds to the rigidity of the filter element of the present invention, and it serves to space an outer filter cake supporting tube from the core. An apertured head member is sealably secured to the core and the sleeve at one end thereof, and an imperforate base member is sealably secured to the opposite end of the core and the sleeve. The core is apertured in a manner such that liquid passing through the tube and the sleeve passes downwardly between the ribs of the core and up through the cavity of the core during a filtering operation and in the reverse direction during the reverse flow of liquid in a cake removal operation. Thus, the filter element of the present invention is entirely composed of plastic material, and is designed to function in the same manner as a conventional blow-down type of filter tube without the necessity of an inner tube.

Further objects and advantages and a better understanding of the present invention will be had by reference to the following detailed description taken in connection with the accompanying drawings wherein:

FIG. 1 is an elevational view, partly broken away showing the manner in which the filter tubes embodying the present invention may be mounted in an associated filter;

FIG. 2 is a fragmentary, elevational view of a tubular filter element embodying the present invention;

FIG. 3 is an enlarged, longitudinal sectional view of the filter element of FIG. 2 taken substantially along the line 3—3 thereof; and FIG. 4 is an enlarged cross-sectional view of the filter element of FIG. 2 taken substantially along the line 4—4 thereof.

Referring now to the drawings and more particularly to FIG. 1 thereof, there is shown a multiple tube filter 10 including as its principal elements a generally cylindrical, vertically disposed tank 12 having a conical bottom wall 14 which is connected to an inlet conduit 16 via an inlet valve 18 for supplying, under pressure, the liquids to be clarified. Supported on a tube sheet 22, a plurality of filter tubes 20 depend into the filter chamber within the tank 12 and are maintained in a spaced-apart relationship by a spacer 23. A dome-shaped cover 24 is sealably secured in place over the tube sheet 22 and an outlet conduit 26 and an outlet valve 27 are connected thereto for conveying the clarified liquid away from the filter. As will be described in greater detail hereinafter, the tubes 20 are substantially cylindrical in shape and have a perforated wall surface across the interstices of which solids entrained in the liquid passing through the filter are trapped. In practice, a filter aid material such as a diatomaceous earth or a finely particulated asbestos is entrained in a liquid which is passed through the filter thereby to deposit a layer of the filter aid material on the surfaces of the tubes 20. This layer of filter aid material is inherently porous and provides the filter media across the pores of which solids entrained in the actual liquid to be clarified are collected.

In operation, as the tank 12 is filled, the filter aid material is recirculated via the inlet line 16 and the inlet valve 18 through the tubes 20 into the chamber in the cover 24 and thence returns through the outlet conduit 26 to the inlet line 16. As the liquid enters the tank 12, air from the portion of the tank below the tube sheet 22 is bled into the tubes and out of the tank in a manner which is hereinafter described. After a suitable precoat layer of the filter aid material has built up on the outer surfaces of the tubes 20, the filter is then ready for operation. During the filtration operation, the entrained solids are removed from the liquid and are deposited on the porous precoat filter cake. The operation can continue until the thickness of the cake increases to the point where operational efficiency is impaired. At this time, the cakes are removed from the filter tubes 20 in a cleaning operation.

The cleaning operation is commenced by first closing the outlet valve 27 and then closing the inlet valve 18. As a result, air trapped in the dome 24 is compressed under a pressure equal to the inlet pressure to the filter. In order to dislodge the filter cake from the filter tubes 20, a large drain valve 29 at the lowermost portion of the bottom wall 14 is then opened to permit the trapped air in the dome 24 to rapidly expand and thereby to force the liquid trapped in the dome through the filter elements 20 and out through the drain valve 29. After dislodging the filter cake, the drain valve 29 is closed, and the filter 10 is returned to normal operation.

Considering now the filter elements 20 in greater detail with reference to FIGS. 2, 3, 4 and 5 of the drawings, the filter element 20 comprises as its principal elements a cylindrical, externally-ribbed tubular plastic core 31, a coarsely perforated plastic sleeve 33 surrounding and tightly fitted over the core 31, a pair of end members 35 and 37 fitted over and sealably secured to the core 31 and the sleeve 33, and a finely perforated filter cake supporting tube or sleeve 39 which surrounds the sleeve 33. In order to sealably secure the sleeve 33 to the filter element 20, as best seen in FIG. 5, a centrally-apertured head collar 40 surrounds a tubular connector 41, and a centrally-apertured base collar 42 surrounds a mounting stud extending from the base end member 37, whereby the sleeve 33 is tightly and sealably secured to the collars by a pair of cords 44 and 44A as hereinafter described in connection with FIGS. 6–8. The core 31 is hollow throughout its length and is composed of a plastic material, such as polypropylene. A plurality of longitudinally extending, equally-spaced ribs 45 extend throughout the length of the core 31, and a plurality of holes 47 located near the bottom end of the core 31 open into its hollow interior. Each of the holes 47 is disposed between a pair of ribs 45 and has a diameter which is sightly less than the distance between the ribs 45. The holes 47 are thus equally spaced about the periphery of the core 31 and are arranged in two separate, closely-spaced planes extending in a direction perpendicular to the axis of the filter element 20. For a filter element which is 36 to 72 inches in length, it has been found that the two planes may be spaced apart by approximately 1 inch, and the lower plane may be spaced from the bottom end of the filter element 20 by approximately 1 inch. Thus, due to the location of the holes 47, most of the fluid flowing through the fine mesh sleeve 39 and the coarsely perforated sleeve 33 during a filtering operation flows downwardly along the outer surfaces of the core 31 between the fluid-guiding ribs 45 and then through the holes 47. Since the fluid is forced to enter the relatively small holes 47, the fluid flows at a high velocity near the bottom end of the core 31 to prevent an accumulation of fine particles which settle out of the fluid. Such an accumulation in the bottom of the tube is known as a heel and can contaminate the filtrate and interfere with the operational efficiency of the filter 10. Also, during the cleaning operation, most of the fluid flowing in a reverse direction through the hollow core 31 flows downwardly and out of the holes 47 at the lower end of the core 31 to evenly dislodge the filter cake from the outer surfaces of the filter element 20. Therefore, due to the location of the holes 47, the filter element 20 possesses the advantages of the prior known tubular filter elements having a blow-down tube.

In order to bleed the air from the portion of the tank 12 below the tube sheet 22 during filling of the tank, a single hole 49 (FIG. 2) is located near the top end of the core 31 between a pair of ribs 45. Thus, the tank 12 need not be provided with a vent below the tube sheet 22, thereby reducing cost of the filter apparatus of the present invention.

The coarsely perforated sleeve 33 serves to space the outer fine mesh sleeve 39 from the core 31, and it also serves to add to the rigidity of the filter element 20. The sleeve 33 is a grid of tubular construction and is formed of an extruded thermoplastic material, such as polypropylene. The grid consists of a plurality of rods or filaments 50 which are integrally united at the points of intersection with a plurality of transverse filaments or rods 52. One material of this type is sold by E. I. du Pont de Nemours & Co. under the trademark Vexar and is formed in a continuous extruding process whereby the filaments 50 and 52 are continuous and are integrally united at the cross-over points to form a seamless tube. Thus, the filaments 50 and 52 are interconnected in the form of a mesh or grid to provide a coarsely-perforated sleeve.

Referring now to FIG. 4, the top end member 35 is a generally cup-shaped head member which is composed of a plastic material, such as polypropylene. The head member 35 fits over the upper end of the core 31 and has a centrally-disposed depending plug member 54 which tightly and sealably fits into the upper end of the hollow cavity in the core 31 so that the externally-ribbed wall 55 of the core 31 and the sleeve 33 fits snugly between the plug member 54 and an annular outer wall 56 of the head member 35. A centrally-disposed threaded aperture 58 in the head member 35 communicates with the cavity in the core 31 and is adapted to receive the externally-threaded connector 41 (FIG. 5) for connection to the tube sheet 22, whereby the cavity in the filter element 20 can be connected in fluid communication with the chamber within the dome 24.

The lower end member 37 is a generally cup-shaped base member which is identical to the head member 35 except that there is no hole therethrough. Accordingly, the cap member 37 is also composed of a plastic material, such as polypropylene. In order to seal over the lower end of the hollow core 31, a centrally-disposed imperforate plug member 61 on the base member 37 fits tightly and sealably into the lower end of the cavity of the core 31 and receives the externally-ribbed wall 55 and the sleeve 33 between the plug member 61 and an outer wall 63 of the base member 37. A centrally-disposed threaded recess 65 in the outer face of the base member 37 is adapted to receive the externally-threaded mounting stud 43 (FIG. 5) for mounting the filter element 20 on the spacer 23 in the tank 12.

In order to sealably and rigidly connect the head member 35 and the base member 37 to both the core 31 and the sleeve 33, the head member and the base member are heat welded to the core 31 and the sleeve 33 by any suitable technique, such as spin welding, whereby the entire tubular filter element 20 is thus formed into a rigid integral unit in an easy and inexpensive manner. For the purpose of facilitating the welding process, pairs of diametrically opposed recesses 67 and 69 are provided in the outer faces of the head member 25 and the base member 37, respectively, so that the assembled unit can be readily held in a mandrel for spin welding purposes.

Referring now to FIGS. 5, 6, 7 and 8 of the drawings, the collars 40 and 42 are composed of an elastomeric material, such as rubber, and are centrally-apertured to permit them to be slipped over the ends of the connector 41 and the stud 43, respectively, and to be positioned against the respective outer faces of the head member 35 and base member 37. In order to sealably secure the sleeve 39 to the filter element 20, a centrally-disposed external circumferential groove 70 in the rubber collar 40 and a similar groove 72 in the base collar 42 receives the respective cords 44A and 44 and the adjacent portion of the sleeve 39 to seal the sleeve 39 to the collars 40 and 42. For the purpose of sealing the collars 40 and 42 to the connector 41 and the stud 43, respectively, the collars 40 and 42 snugly surround the connector 41 and the stud 43, respectively.

In order to dress the filter element 20 with the filter-cake supporting sleeve 39, the sleeve 39 is slipped over the filter element 20 until the end of the sleeve is approximately aligned with the bottom edge of the base collar 42. The cord 44 is then wrapped about the outer surface of the bottom portion of the sleeve 39 opposite the peripheral groove 72 in the collar 42. The cord 44 is then pulled tightly about the sleeve 39 and tied in place to seat the cord 44 and the adjacent portion of the sleeve 39 in the groove 72 of the base collar 42 and to compress the collar 42 about the stud 43. A free end loop 74 of the cord 44 as shown in FIG. 6 is then slipped over the end of the mounting stud 43 so that when the filter element 20 is mounted on an upstanding pin 76 of the grid-like space 23 in the filter tank 12, the end loop 74 also surrounds the pin 76 and thus is restrained. As shown in FIGS. 7 and 8, the upper end of the sleeve 39 is similarly tied with the cord 44A about the sleeve 39 opposite the peripheral groove 70 in the upper collar 40. The excess material 78 at the upper end of the sleeve 39 can then be folded over the cord 44A to restrain a free end 81 of the cord 44A.

In order to readily tie the cords in place, and also to permit the cords to be readily untied for removal of the sleeve 39, each of the cords, such, for example, as the cord 44A, comprises a loop of cord, such as polypropylene braided cord or other suitable cord, which is tied in a loop with a square knot or other suitable knot. The loop is then wrapped about the outer surface of the sleeve 39 opposite the peripheral groove 72 in the collar 42, and the end 81 of the loop is slipped through the opposite end 83 of the loop of cord 44A and then pulled back and slipped under one of the cords of the loop. The loop 81 is then pulled tight to cause the cord 44A and the adjacent portion of the sleeve 39 to be wedged into the groove 72 of the collar 42, thereby firmly seating the cord 44A in place.

In view of the foregoing description of the disclosed embodiment of the present invention, it should now be apparent that the filter element of the present invention includes an externally-ribbed plastic core which is hollow throughout its length, and a coarsely-perforated plastic sleeve which spaces an outer finely-perforated tubular cake supporting medium from the inner core. A pair of plastic end members are heat welded to the core and the sleeve to provide a sturdy unitary construction, which is relatively inexpensive and easy to manufacture and which is able to withstand high pressure differentials. Since the filter unit of the present invention is composed entirely of plastic material, the unit will not corrode even after repeated use in highly corrosive materials. Moreover, the filter element of the present invention possesses all of the advantages of prior art tubular filter elements having blow-down tubes without the necessity of an inner tube. In this regard, due to the location of the holes in the core, the filter element of the present invention prevents the accumulation of fine particles at the bottom of the inside of the element, and it permits the filter cake to be evenly dislodged during the cleaning operation.

While the present invention has been described in connection with a particular embodiment thereof, it will be understood that those skilled in the art may make many changes and modifications without departing from the true spirit and scope of the invention. Therefore, by the appended claims it is intended to cover all such changes and modifications as come within the true spirit and scope of this invention.

What is claimed is:

1. A filter element for use in a filter having means for providing a reverse flow of fluid through the filter element, said filter element including a unitary, tubular, plastic core having a plurality of continuous external ribs extending longitudinally throughout the length of said core, a head member sealably bonded over the upper end of said core and having a passageway therethrough opening into said core, an imperforate base member sealably bonded over the bottom end of said core, a coarsely perforated plastic sleeve surrounding and tightly fitting over said core from said head member to said base member, said sleeve being bonded to said head and base members, and a fine mesh sleeve removably positioned over said plastic sleeve, said core being essentially imperforate except near the bottom where it is provided with a plurality of radial passageways extending therethrough, whereby liquid passing into the filter element through said sleeves flows downwardly between said ribs along the outside of said core to the bottom thereof, through said passageways into said core and upwardly through the central cavity in said core.

2. A filter element according to claim 1, wherein said core includes means defining a given number of passageways near said one end for passing air during filling thereof, and means defining a relatively larger number of apertures near said other end for passing the bulk of fluid during the filter operation and during the cake removal operation.

3. A filter element according to claim 2, wherein said given number is 1, and said larger number of passageways are equally-spaced about the periphery of said core and are arranged in two separate, closely-spaced planes extending in a direction perpendicular to the axis of said filter element, said planes being disposed within a given distance from the outer end of said base member, said given distance being less than 10 percent of the length of said filter element.

4. A filter element according to claim 2, wherein said core is composed of polypropylene.

5. A filter element according to claim 2, wherein said coarsely perforated plastic sleeve comprises a grid of tubular construction, said grid consisting of a plurality of first filaments and a plurality of transverse filaments integrally connected at the points of intersection with said first filament to form a seamless tube.

6. A filter element according to claim 5, wherein said sleeve is composed of polypropylene.

7. A filter element according to claim 5, wherein said head member has a depending, annular outer wall and includes a centrally-disposed depending plug member tightly fitting into the cavity at said one end of said core so that said core and said sleeve fit snugly between said plug member and the outer wall of said head member.

8. A filter element according to claim 5, wherein said head member is composed of polypropylene.

9. A filter element according to claim 7, wherein said base member has an upstanding annular wall and includes a centrally-disposed plug member fitting tightly into said other end of said core, said core and said sleeve being positioned between said plug member and the outer wall of said base member and being bonded thereto such that the filter element is a rigid integral unit.

10. A filter element according to claim 8, wherein said base member is composed of polypropylene.

11. A filter element for use in a filter having means for reversing the flow of liquid through the filter element to remove a filter cake deposited thereon, said filter element including a tubular core over which a finely perforated filter cake supporting medium is mounted, the improvement comprising a unitary tubular, plastic core having a plurality of longitudinally extending external ribs, a head member sealably secured by bonding over one end of said core and having an axial passageway therethrough opening into said core, an imperforate base member sealably secured by bonding over the other end of said core, and a coarsely perforated, seamless plastic sleeve surrounding and tightly fitting over said core, said core being provided with a plurality of radial passageways extending therethrough, a tubular connector connecting to said head member and communicating with said axial aperture in said head member, a mounting stud connected to said base member, an elastomeric centrally-apertured head collar surrounding said connector, an elastomeric centrally-apertured base collar sealably surrounding said mounting stud, said collars each having an external, annular peripheral groove, and a pair of cords each arranged in a continuous loop and securing a filter cake supporting medium to said collars, said cords being seated in said grooves of said collars whereby when secured in place, said cords seal said filter cake supporting medium to said collars.

* * * * *